Patented Sept. 14, 1926.

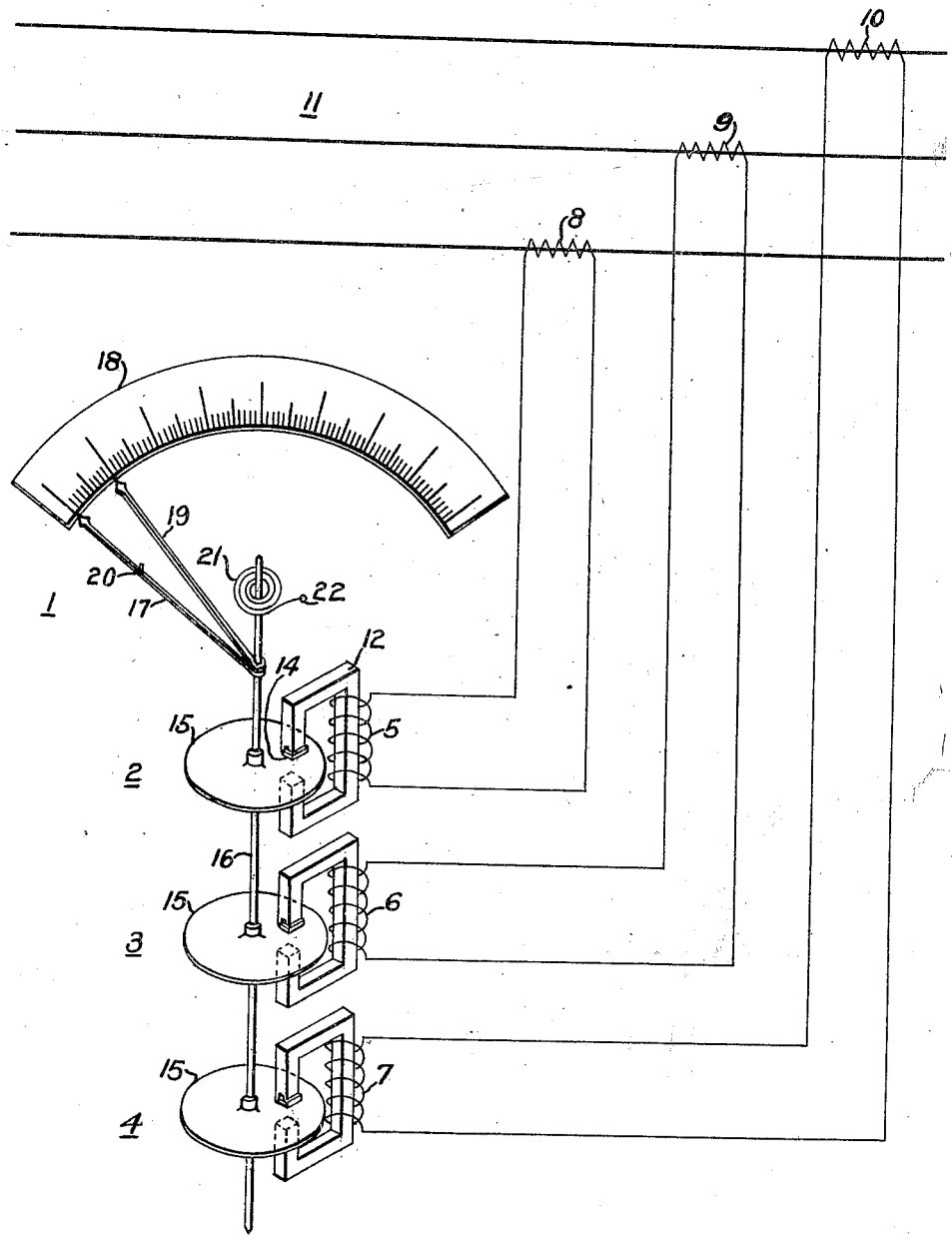

1,599,575

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING SYSTEM.

Application filed September 27, 1922. Serial No. 590,808.

My invention relates to electrical measuring systems and particularly to methods and means whereby an equitable tariff for electrical power consumption may be determined.

One object of my invention is to provide a simple, effective and economical method of basing the tariff for electrical power consumption that compensates for low power factor in multi-phase alternating-current circuits.

Another object of my invention is to provide a method of metering and an instrument for practicing the method that shall compensate or penalize for unbalanced loads in a multi-phase circuit.

Heretofore, it has been usual to base the tariff for electrical power on the kilowatt-hour consumption. Since the cost of generating and distributing the power and the losses in distribution, are proportional to voltage and current values, irrespective of phase relation, it is desirable to provide a more equitable system for basing the tariff.

Unbalance in a polyphase load is also an important factor in increasing the cost of supplying power and, therefore, an equitable tariff rate should be based upon a method in which both power factor and unbalance are taken into consideration. Several methods of basing the charges for polyphase electrical power distribution have been employed which require computations from the readings of two instruments and which do not penalize the user for unbalance.

It has also been suggested to employ instruments for reading volt-ampere hours, but, to the best of my knowledge, most of these suggestions have either involved impractical devices or devices of excessive complication and expense.

It is my aim to eliminate many or all of the objections to the methods of tariff charging heretofore suggested and employed and to provide a method and an instrument for practicing the method that shall be simple, economical and effective.

Since the purpose of penalization in commercial polyphase circuits is to maintain the amperes and losses at a minimum for a given wattage, I measure the sum of the amperes in the several phases by means of an instrument which is actuated in accordance with the sum of the squares of the currents in the several phases and base the tariff charge on the amperes indicated.

An instrument for effectively practicing this method in connection with a three-phase circuit may comprise three single-phase ammeters mounted on a single shaft and adapted to be acuated in accordance with the sum of the squares of the currents on the different phases.

The single figure of the accompanying drawing is a diagrammatic view of an instrument embodying one means of practicing my invention, together with a view of a portion of a circuit with which the instrument may be employed.

A composite ammeter 1, which is shown as an indicating instrument but which may as readily be a graphic or an integrating instrument, comprises three ammeter elements 2, 3 and 4 having coils 5, 6 and 7 which are connected, respectively, to current transformers 8, 9 and 10 of a three-phase alternating-current circuit 11.

The coils 5, 6 and 7 are wound on core members 12 having short-circuited windings 14 thereon and are adapted to co-operate with armatures 15. The latter, preferably of disk shape and constructed of aluminum or copper, are secured to a common shaft 16 on which a pointer 17, for co-operation with a scale member 18, is mounted. A maximum indicating pointer 19, loosely related to the shaft 16 and adapted to be moved by a projection 20 on the pointer 17 may also be provided. A spiral spring 21 is connected between the shaft 16 and a fixed member 22 to oppose movement of the shaft 16 by the coils 5, 6 and 7.

In operation, the shaft 16 is turned against the action of the spring 21 in proportion to the sum of the squares of the currents in the several phases of the circuit 11 in accordance with the usual principle of induction meters of the type shown. However, the scale 18 may be graduated to read amperes directly.

In the above-described arrangement, if unbalanced current conditions obtain, the composite instrument 1 will read high, by reason of the fact that the individual meter elements 2, 3 and 4 are actuated in accordance with the squares of the currents in the several phases. For instance, if the circuit 11 is balanced and there are five amperes flowing in each phase, the scale reading will be fifteen amperes. However, since the device operates in accordance with the squares of the currents, if the fifteen amperes are not evenly divided into five amperes in each phase, the scale reading will be more than fifteen amperes. Thus, with a total of fifteen amperes divided into four, five and six amperes in the several phases, respectively, the composite reading will be higher than fifteen amperes by the proportion of seventy-seven to seventy-five.

In addition to the above-described penalty, the user will be penalized in accordance with the power factor of the load.

Low power factor, as is well known, causes an idle or wattless current component, out of phase with the applied voltage, which does no useful work and is not registered by watt-hour meters. By my invention, this component is added to the useful component and the entire current demanded by the user's load, whether it be utilized or not, is registered.

Further, the two features of unbalance and low power factor may exist separately or simultaneously in the circuit and be automatically taken care of by the device of my invention. That is, there may be unbalance and unity power factor, balance and low power factor or unbalance and low power factor in the circuit. Thus, the excess current caused by low power factor will be registered and a penalty for unbalance will be imposed.

The device of my invention may be employed in connection with an intergrating wattmeter with which it may be combined as a single structure and the tariff based on maximum ampere demand similarly as has been done with wattmeters having maximum-demand attachments. In this case the ordinary voltage fluctuations will be taken into account by the wattmeter readings.

While I have shown and described a particular form of my invention changes may be effected therein without departing from the spirit and scope thereof, as set forth in the appended claims.

I claim as my invention:

1. In a measuring instrument, the combination with a polyphase alternating-current circuit, of indicating means, a plurality of actuating means therefor, and a local circuit for each actuating means related to one phase of the circuit and responsive to the square of the current in said local circuit.

2. In a measuring instrument, the combination with a polyphase alternating-current circuit, of indicating means and means including elements associated with each phase of said circuit for actuating the indicating means in accordance with the sum of the squares of currents derived from the several phases.

3. In a measuring instrument, the combination with a polyphase alternating-current circuit, of indicating means and a plurality of meter elements each responsive to the square of the current in one of said phases for actuating the indicating means.

4. In a measuring instrument, the combination with a polyphase alternating-current circuit and a current transformer associated with each phase thereof, of indicating means and a plurality of meter elements each connected only to one of the transformers for actuating the indicating means.

5. In a measuring instrument, the combination with a polyphase alternating-current circuit and a current transformer associated with each phase thereof, of indicating means, a single operating member therefor and means including a plurality of coils each only connected in series with the secondary winding of one of said transformers for moving the operating member.

In testimony whereof, I have hereunto subscribed my name this 20th day of September 1922.

PAUL MacGAHAN.